(12) United States Patent
Carling et al.

(10) Patent No.: US 7,089,153 B2
(45) Date of Patent: Aug. 8, 2006

(54) REPLACEABLE COMPONENT MANAGEMENT TOOL

(75) Inventors: Richard R. T. Carling, Webster, NY (US); Mark R. Mosher, Victor, NY (US); Todd C. Otremba, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 3 days.

(21) Appl. No.: 10/903,045

(22) Filed: Jul. 30, 2004

(65) Prior Publication Data

US 2006/0025963 A1 Feb. 2, 2006

(51) Int. Cl.
*G06F 3/14* (2006.01)

(52) U.S. Cl. .................. 702/182; 702/84; 702/183; 702/185

(58) Field of Classification Search .......... 702/84, 702/184; 399/24; 705/14
See application file for complete search history.

(56) References Cited

U.S. PATENT DOCUMENTS

| 5,923,834 | A  | * | 7/1999  | Thieret et al. ............... 714/25 |
| 6,295,423 | B1 | * | 9/2001  | Haines et al. ............... 399/24 |
| 2002/0188504 | A1 | * | 12/2002 | Whale ........................ 705/14 |
| 2004/0135838 | A1 | * | 7/2004  | Owen et al. ................. 347/19 |
| 2005/0074246 | A1 | * | 4/2005  | Hayward et al. ............. 399/8 |

* cited by examiner

*Primary Examiner*—Marc S. Hoff
*Assistant Examiner*—Felix Suarez
(74) *Attorney, Agent, or Firm*—Justin D. Petruzzelli

(57) ABSTRACT

Automatically maintaining, for life tracking purposes, the correct set of replaceable components in systems with variable configurations and replaceable components using replaceable component data from four sources to determine the correct set of replaceable components for life tracking purposes. The four sources are: 1) hardware driven sensor data provided by the low level system control computer, 2) machine modification data from the list of upgrades that have been performed on the system, 3) configuration specific replaceable component data based on the replaceable component information that is known about each possible system configuration, and 4) replaceable component information obtained by prompting the field service engineer for any supplemental information that cannot be determined automatically from the first three sources.

8 Claims, 6 Drawing Sheets

REPLACEABLE COMPONENT MANAGEMENT TOOL

FIELD OF THE INVENTION

This invention relates to the management of replaceable components in a system, and more particularly to determining the correct set of replaceable components to be used in the replaceable component life tracking system of an apparatus with variable configurations.

BACKGROUND OF THE INVENTION

Many systems have multiple components that wear at different rates and are replaced as they wear out in order to keep the whole system operating. In such systems the replacement of some or all worn out components may require specially trained service professionals such as field service engineers. Some systems may be provided with replaceable components that are replaceable by the system operator, thereby eliminating or, at least reducing the frequency of, the need to place a service call. This not only may reduce overall maintenance costs, but also reduces system down time by eliminating response time. In either case, replacement by a service call or by the operator, it is desirable to track the usage of replaceable components so as to accurately anticipate when they will fail. U.S. Pat. No. 6,718,285 issued to Schwartz, et al., issued Apr. 6, 2004, henceforth referred to as the Schwartz patent, discloses a replaceable component life tracking system and is hereby incorporated in this application by reference.

The Schwartz patent discloses a replaceable component life tracking system in which the usage of each replaceable component is tracked using a predetermined parameter. In a preferred embodiment, the system is a printing device and the usage of each replaceable component is tracked using the number of pages printed. The life expectancy of each replaceable component is predetermined, and as the usage of each replaceable component is tracked. It is compared to the predetermined life expectancy, and the result periodically reported to the system operator via an operator interface. If any replaceable component usage reaches the life expectancy of that replaceable component, the operator is notified immediately, and instructed that the replaceable component be replaced.

Some systems with replaceable components may have more than one possible configuration and each configuration may have a different set of replaceable components. This can occur with large systems that are, from time to time, updated at the customer site, with newly developed features, with modifications to correct problems not foreseen at product launch, with customer requested custom modifications, or various other reasons. If the set of replaceable components changes for the different configurations, the replaceable component life tracking system must obviously be made aware of the changes and loaded with the correct set of replaceable components. As the number of possible system configurations increases the task of identifying the correct set of replaceable components for the replaceable component life tracking system becomes more difficult and the possibility of an erroneous set becomes more likely, especially if the burden of maintaining the correct set of replaceable components is on the field service technician or the operator. The need exists for a more automated tool for maintaining the correct set of replaceable components.*eb*;
*normal*

SUMMARY OF THE INVENTION

In light of the above, the object of the present invention is to provide a tool for automatically maintaining, for life tracking purposes, the correct set of replaceable components in systems with variable configurations and replaceable components. The method and system of the invention use replaceable component data from four sources to determine the correct set of replaceable components for life tracking purposes. The four sources are: 1) hardware driven sensor data provided by the low level system control computer, 2) machine modification data from the list of upgrades that have been performed on the system, 3) configuration specific replaceable component data based on the replaceable component information that is known about each possible system configuration, and 4) replaceable component information obtained by prompting the field service engineer for any supplemental information that cannot be determined automatically from the first three sources.

The invention, and its objects and advantages, will become more apparent in the detailed description of the preferred embodiment presented below.

DETAILED DESCRIPTION OF THE INVENTION

Figure 1:
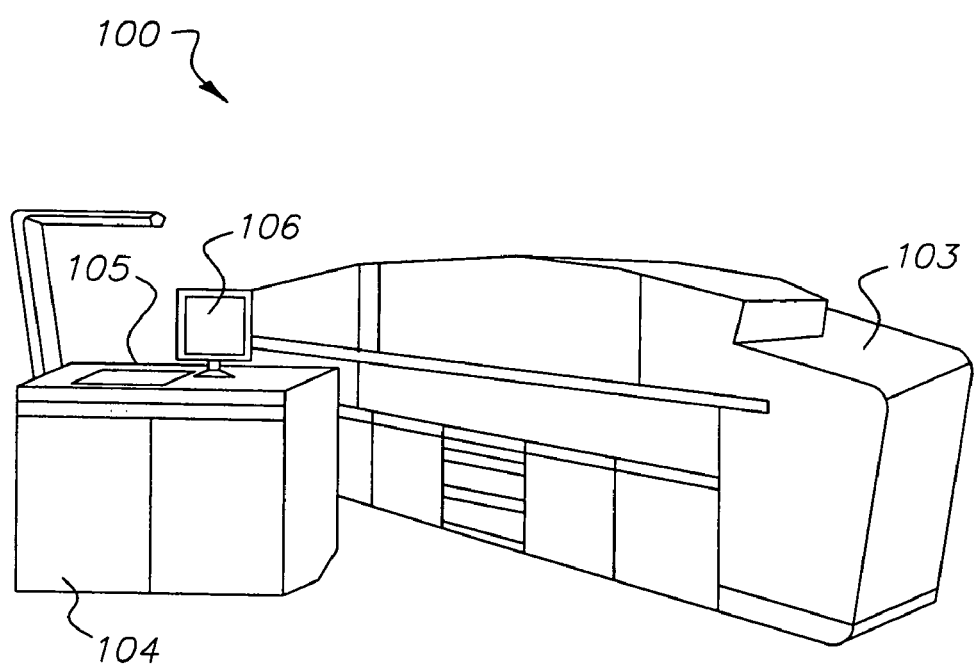
FIG. 1 is an illustration of a system having a digital printer, a digital front end, and a user interface that is a preferred embodiment of the invention.

FIG. 1 is an illustration of a system 100 according to the preferred embodiment of the present invention, and includes a digital printer 103, a Digital Front End (DFE) controller 104, and a Graphical User Interface (GUI) 106. Digital printer 103 is provided with Operator Replaceable Component (ORC) devices that enable a typical operator to perform the majority of maintenance on the system without requiring the services of a field engineer. The ORC devices of the present invention are those components within systems that become worn after periods of use and must be replaced. Specifically, the ORC devices of the preferred embodiment herein, are those components used within digital printing systems that wear with use and must be replaced. Digital printer 103, in the preferred embodiment, is for example, a NexPress 2100 Color On Demand Printer, available from NexPress Solutions, Inc., of Rochester, N.Y. However, the present invention pertains to systems in general and digital printing systems in particular, and to such systems with replaceable components, whether the replaceable components are replaceable by the operator or require field service engineer intervention.

DFE controller 104 in the preferred embodiment is a control system located adjacent to the printer 103, and includes a computational element 105. Computational element 105 contains a substantial number of software processing components that perform a number of functions including raster image processing, database management, workflow management, job processing, and ORC service management including tracking of ORC usage. Graphical User Interface (GUI) 106 communicates with computational element 105 and with the operator. Tracking of ORC usage in this preferred embodiment is disclosed in the referenced Schwartz patent, U.S. Pat. No. 6,718,285. In the preferred embodiment, GUI 106 provides the operator with the ability to view the current status of ORC devices in the digital printer 103 and to thus perform maintenance in response to maintenance information provided on the graphical display on GUI 106 as well as to alerts that are provided from the DFE controller 104. It should be understood that while the preferred embodiment details a system 100 with a digital printer 103 having at least one computational element and another computational element associated with DFE controller 106, similar systems can be provided with more computational elements or fewer computational elements, and that these variations will be well known to those skilled in the art. In general, virtually any interactive device can function as DFE controller 104, and specifically any Graphics User Interface (GUI) 106 can function in association with DFE controller 104 as employed by the present invention.

Figure 2:
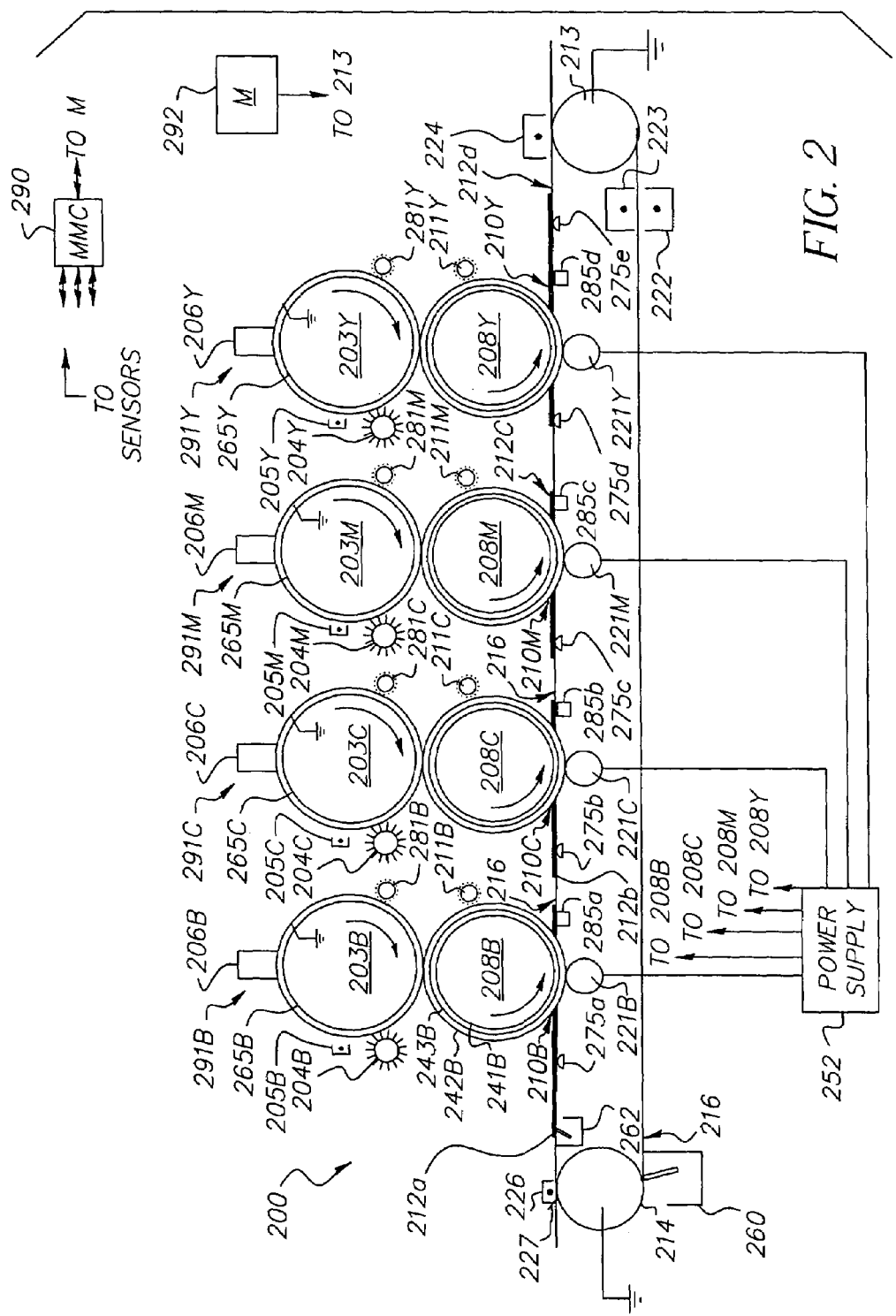
FIG. 2 is an illustration of the digital printer of FIG. 1 with the cabinetry removed showing a number of operator replaceable components.

Referring now to FIG. 2 of the accompanying drawings, the area inside digital printer 103 is schematically illustrated, showing the image forming reproduction apparatus according to the preferred embodiment of the present invention, designated generally by the numeral 200. The reproduction apparatus 200 is in the form of an electrophotographic reproduction apparatus, and more particularly, a color reproduction apparatus wherein color separation images are formed in each of four color modules and transferred in register to a receiver member as a receiver member is moved through the apparatus while supported on a paper transport web (PTW) 216. The apparatus 200 illustrates the image forming areas for a digital printer 103 having four color modules, although the present invention is applicable to printers of all types, including printers that print with more or less than four color modules.

The elements in FIG. 2 that are similar from module to module have similar reference numerals with a suffix of B, C, M and Y referring to the color module for which it is associated; black, cyan, magenta and yellow, respectively. Each module (291B, 291C, 291M, 291Y) is of similar construction. PTW 216, which may be in the form of an endless belt, operates with all the modules 291B, 291C, 291M, 291Y and the receiver member is transported by PTW 216 from module to module. Four receiver members, or sheets, 212a, b, c and d are shown simultaneously receiving images from the different modules, it being understood that each receiver member may receive one color image from each module and that in this example up to four color images can be received by each receiver member. The movement of the receiver member with the PTW 216 is such that each color image transferred to the receiver member at the transfer nip of each module is a transfer that is registered with the previous color transfer so that a four-color image formed on the receiver member has the colors in registered superposed relationship on the receiver member. The receiver members are then serially detacked from the PTW 216 and sent to a fusing station (not shown) to fuse or fix the toner images to the receiver member under heat and/or pressure. The PTW 216 is reconditioned for reuse by providing charge to both surfaces using, for example, opposed corona chargers 222, 223 which neutralize the charge on the two surfaces of the PTW 216. These chargers 222, 223 are operator replaceable components within the preferred embodiment and have an expected life span after which chargers 222, 223 will require replacement.

Each color module includes a primary image-forming member (PIFM), for example a rotating drum 203B, C, M and Y, respectively. The drums rotate in the directions shown by the arrows and about their respective axes. Each PIFM 203B, C, M and Y has a photoconductive surface, upon which a pigmented marking particle image is formed. The PIFM 203B, C, M and Y have predictable lifetimes and constitute operator replaceable components. The photoconductive surface for each PIFM 203B, C, M and Y within the preferred embodiment is actually formed on outer sleeves 265B, C, M and Y, upon which the pigmented marking particle image is formed. These outer sleeves 265B, C, M and Y, have lifetimes that are predictable and therefore, are operator replaceable components. In order to form images, the outer surface of the PIFM is uniformly charged by a primary charger such as corona charging devices 205B, C, M and Y, respectively or other suitable charger such as roller chargers, brush chargers, etc. The corona charging devices 205B, C, M and Y each have a predictable lifetime and are operator replaceable components.

The uniformly charged surface is exposed by suitable exposure device, such as, for example, a laser 206B, C, M and Y, or more preferably an LED or other electro-optical exposure device, or even an optical exposure device, to selectively alter the charge on the surface of the outer sleeves 265B, C, M and Y, of the PIFM 203B, C, M and Y to create an electrostatic latent image corresponding to an image to be reproduced.

The electrostatic latent image is developed by application of charged pigmented marking particles to the latent image bearing photoconductive drum by a development station 281 B, C, M and Y, respectively. The development station has a particular color of pigmented marking particles associated respectively therewith. Thus, each module creates a series of different color marking particle images on the respective photoconductive drum. The development stations 281B, C, M and Y, have predictable lifetimes before they require replacement and are operator replaceable components. In lieu of a photoconductive drum, which is preferred, a photoconductive belt can be used.

Each marking particle image formed on a respective PIFM is transferred electrostatically to an intermediate transfer module (ITM) 208B, C, M and Y, respectively. The ITM 208B, C, M and Y have an expected lifetime and are, therefore, considered to be operator replaceable components. In the preferred embodiment, each ITM 208B, C, M and Y, has an outer sleeve 243B, C, M and Y that contains the surface to which the image is transferred from PIFM 203B, C, M and Y. These outer sleeves 243B, C, M and Y are considered operator replaceable components with predictable lifetimes. The PIFMs 203B, C, M and Y are each caused to rotate about their respective axes by frictional engagement with their respective ITM 208B, C, M and Y. The arrows in the ITMs 208B, C, M and Y indicate the direction of their rotation. After transfer, the marking particle image is cleaned from the surface of the photoconductive drum by a suitable cleaning device 204B, C, M and Y, respectively to prepare the surface for reuse for forming subsequent toner images. Cleaning devices 204B, C, M and Y are considered operator replaceable components by the present invention.

Marking particle images are respectively formed on the surfaces 242B, C, M and Y for each of the outer sleeve 243B, C, M and Y for ITMs 208B, C, M and Y, and transferred to a receiving surface of a receiver member, which is fed into a nip between the intermediate image transfer member drum and a transfer backing roller (TBR) 221B, C, M and Y, respectively. The TBRs 221B, C, M and Y have predictable lifetimes and are considered to be operator replaceable components by the invention. Each TBR 221B, C, M and Y, is suitably electrically biased by a constant current power supply 252 to induce the charged toner particle image to electrostatically transfer to a receiver member. Although a resistive blanket is preferred for TBR 221B, C, M and Y, the TBR 221B, C, M and Y can also be formed from a conductive roller made of aluminum or other metal. The receiver member is fed from a suitable receiver member supply (not shown) and is suitably "tacked" to the PTW 216 and moves serially into each of the nips 210B, C, M and Y where it receives the respective marking particle image in a suitable registered relationship to form a composite multicolor image. As is well known, the colored pigments can overlie one another to form areas of colors different from that of the pigments.

The receiver member exits the last nip and is transported by a suitable transport mechanism (not shown) to a fuser where the marking particle image is fixed to the receiver member by application of heat and/or pressure. A detack charger 224 may be provided to deposit a neutralizing charge on the receiver member to facilitate separation of the receiver member from the PTW 216. The detack charger 224 is another component that is considered to be operator replaceable within the invention. The receiver member with the fixed marking particle image is then transported to a remote location for operator retrieval. The respective ITMs 208B, C, M and Y are each cleaned by a respective cleaning device 211B, C, M and Y to prepare it for reuse. Cleaning devices 211B, C, M and Y are considered by the invention to be operator replaceable components having lifetimes that can be predicted.

In feeding a receiver member onto PTW 216, charge may be provided on the receiver member by charger 226 to electrostatically attract the receiver member and "tack" it to the PTW 216. A blade 227 associated with the charger 226 may be provided to press the receiver member onto the belt and remove any air entrained between the receiver member and the PTW. The PTW 216, the charger 226 and the blade 227 are considered operator replaceable components.

The endless transport web (PTW) 216 is entrained about a plurality of support members. For example, as shown in FIG. 2, the plurality of support members are rollers 213, 214 with preferably roller 213 being driven as shown by motor M to drive the PTW. Support structures 275a, b, c, d and e are provided before entrance and after exit locations of each transfer nip to engage the belt on the backside and alter the straight line path of the belt to provide for wrap of the belt about each respective ITM. This wrap allows for a reduced pre-nip ionization and for a post-nip ionization that is controlled by the post-nip wrap. The nip is where the pressure roller contacts the backside of the PTW or where no pressure roller is used, where the electrical field is substantially applied. However, the image transfer region of the nip is a smaller region than the total wrap. Pressure applied by the transfer backing rollers (TBRs) 221B, C, M and Y is upon the backside of the belt 216 and forces the surface of the compliant ITM to conform to the contour of the receiver member during transfer. The TBRs 221B, C, M and Y may be replaced by corona chargers, biased blades or biased brushes, each of which would be considered by the invention to be operator replaceable components. Substantial pressure is provided in the transfer nip to realize the benefits of the compliant intermediate transfer member, which are a conformation of the toned image to the receiver member and image content on both a microscopic and macroscopic scale. The pressure may be supplied solely by the transfer biasing mechanism or additional pressure applied by another member such as a roller, shoe, blade or brush, all of which are operator replaceable components as envisioned by the present invention.

The receiver members utilized with the reproduction apparatus 200 can vary substantially. For example, they can be thin or thick paper stock (coated or uncoated) or transparency stock. As the thickness and/or resistivity of the receiver member stock varies, the resulting change in impedance affects the electric field used in the nips 210B, C, M, Y to urge transfer of the marking particles to the receiver members. Moreover, a variation in relative humidity will vary the conductivity of a paper receiver member, which also affects the impedance and hence changes the transfer field. Such humidity variations can affect the expected lifetime of operator replaceable components.

Appropriate sensors (not shown) of any well known type, such as mechanical, electrical, or optical sensors for example, are utilized in the reproduction apparatus 200 to provide control signals for the apparatus. Such sensors are located along the receiver member travel path between the receiver member supply, through the various nips, to the fuser. Further sensors are associated with the primary image forming member photoconductive drums 203, the intermediate image transfer member drums 208, the transfer backing members 221, and the various image processing stations. As such, the sensors detect the location of a receiver member in its travel path, the position of the primary image forming member photoconductive drums 203 in relation to the image forming processing stations, and respectively produce appropriate signals indicative thereof.

All sensor signals are fed as input information to Main Machine Control (MMC) unit 290, which contains a computational element, and communicates with DFE controller 104. Based on such signals the MMC unit 290 produces signals to control the timing of the various electrostatographic process stations for carrying out the reproduction process and to control drive by motor 292 of the various drums and belts. The production of a program for a number of commercially available microprocessors, which are suitable for use with the MMC, is a conventional skill well understood in the art.

Referring now to FIGS. 3A–D, there is shown a block diagram and a series of steps illustrating the preferred embodiment of the ORC management tool of the present invention. Items common to FIGS. 1, 2, and 3A–D are identified with the same numeral in all figures. The MMC 290, DFE 104, and GUI 106 are each composed of a substantial number of software processing components, but only those pertinent to the preferred embodiment of the present invention are illustrated. In the MMC 290, the EP Component 42 represents the collection of sensors in the electrophotographic reproduction apparatus 200 described above, and the ORC Manager 40 is the component responsible for maintaining ORC data and tracking ORC life. ORC Manager 40 stores ORC life tracking data in the database ORC Data Tracking 48. In the DFE 104 the Engine Component 36 is responsible for communicating with the EP Component 42 and routing the communications to the ORC Service Component 34, which is responsible for all ORC service functions. Client Communications Layer 32 is responsible for communications with GUI 106. In the GUI 106, the Client ORC 16 component is responsible for displaying ORC database tables, and the Client Message Reporting 18 component reports messages to the operator.

Stored in separate databases are the ORC Configuration Specific Data 22 and ORC Full Set 24. The ORC Configuration Specific Data 22 represents the ORC configuration specific data for the various configurations that can result from various updates that have become available to printing system 100. These updates become available from time to time as the result of newly developed features, modifications to correct problems not foreseen at product launch, customer requested custom modifications, or for various other reasons. A specific printing system 100 embodiment as described above may receive none, some, or all of the available updates. Each configuration will have an ORC configuration specific set of ORCs associated with it, and this data is stored and identified as numeral 22 in FIGS. 3A–D. For various reasons, all possible ORCs are not necessarily included in the ORC Configuration Specific Data 22. For example, individual ORCs may have variations, such as development station 281 with different custom color marking particles, but only one variation can be used at a time. Also, some machine modifications may result in ORC changes but not configuration changes. Any time this type of machine modification is performed, pertinent modification data is stored in database Machine Mods 46. Also, some ORCs may be sourced from more that one vendor, and the same ORCs from different vendors may not be interchangeable. ORC Full Set 24 represents the stored list of all possible ORCs that results from all of the possible configurations, modifications, or from any other reason.

ORC Configuration Tool Applet 20 receives input from four different sources to determine the correct ORC set to be used by ORC Manager 40 for ORC life tracking and by ORC Service Component 34 for any other ORC service functions. The four sources of ORC information used by ORC Configuration Tool Applet 20 are: 1) ORC Configuration Specific Data 22, 2) machine mods 46, 3) the sensors of the MMC EP Component 42, collectively denoted by numeral 44 in FIGS. 3A–D, and 4) any ORC data manually input to ORC Configuration Tool Applet 20 by a field engineer or operator. Based on the data from these four sources ORC Configuration Tool Applet 20 filters from ORC Full Set 24 the correct ORC set to be used by ORC Manager 40 for ORC life tracking and by ORC Service Component 34 for any other ORC service functions. ORC Configuration Tool Applet 20 stores the correct ORC set in database ORC Properties 38.

Figure 3A:
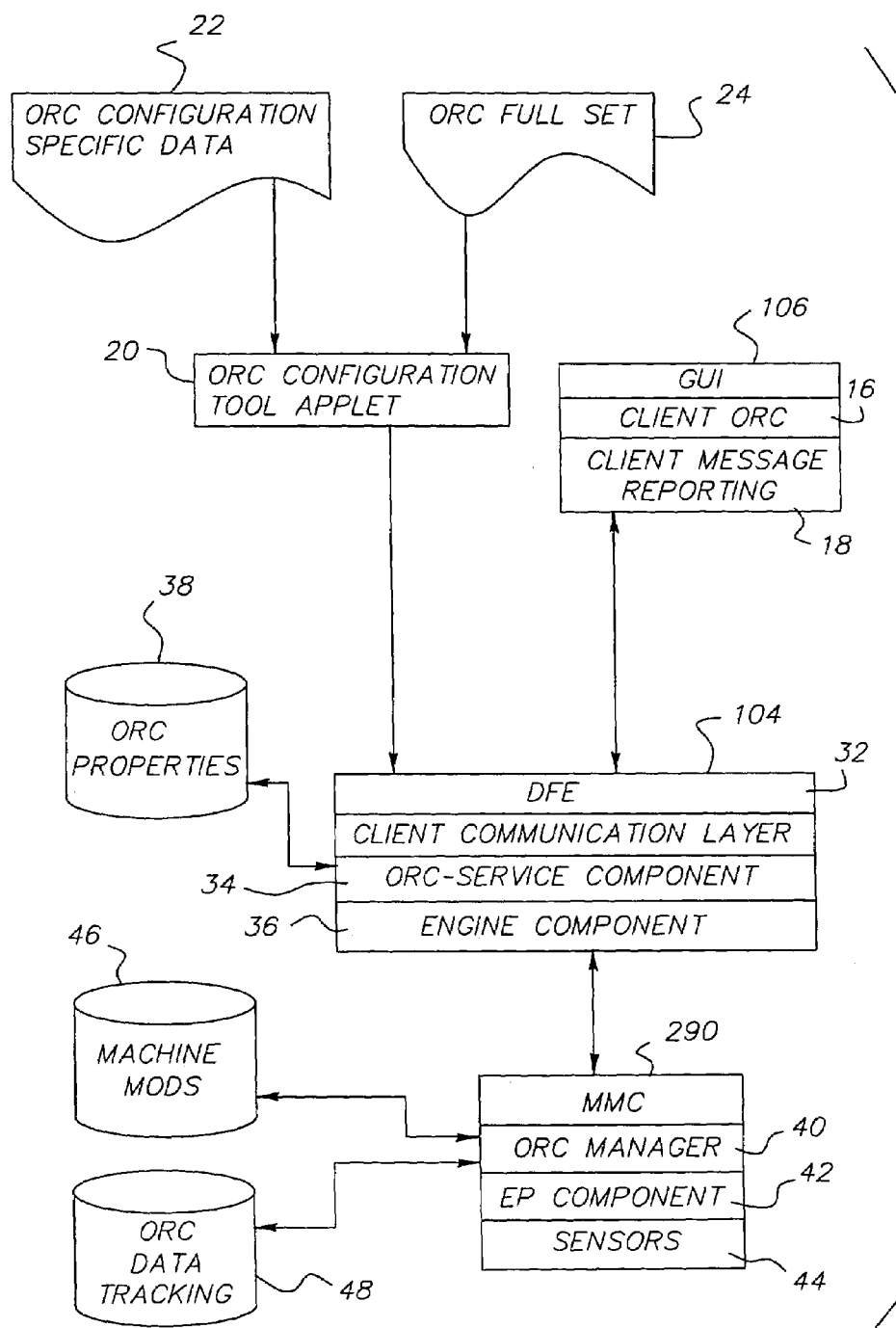
FIG. 3A is a basic high-level block diagram illustrating the pertinent software components of the digital printer, digital front end, and graphical user interface that is a preferred embodiment of the invention.
Figure 3B:
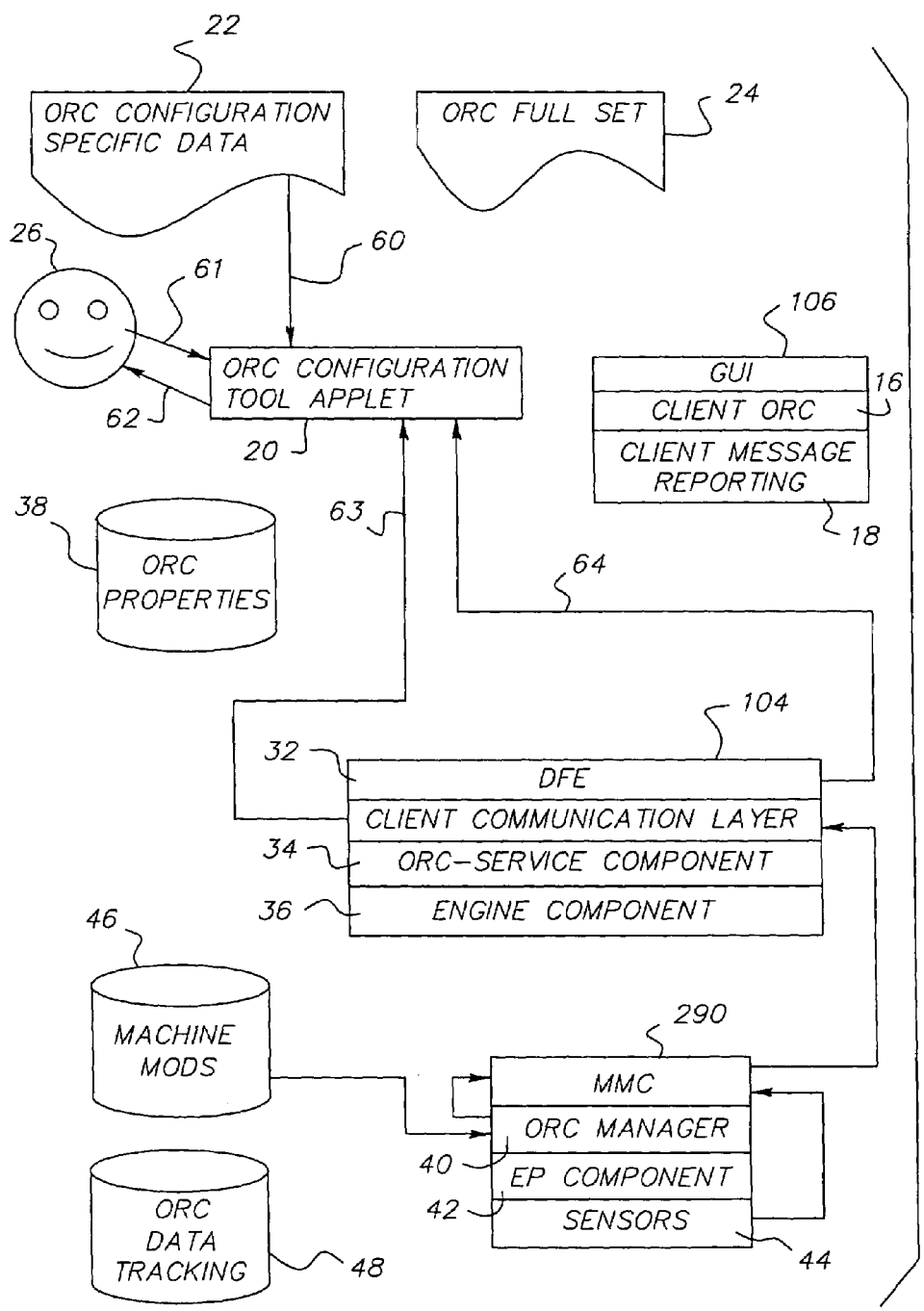
FIG. 3B is the block diagram of FIG. 3A with arrows illustrating the data retrieval steps in the preferred embodiment of the invention.
Figure 3C:
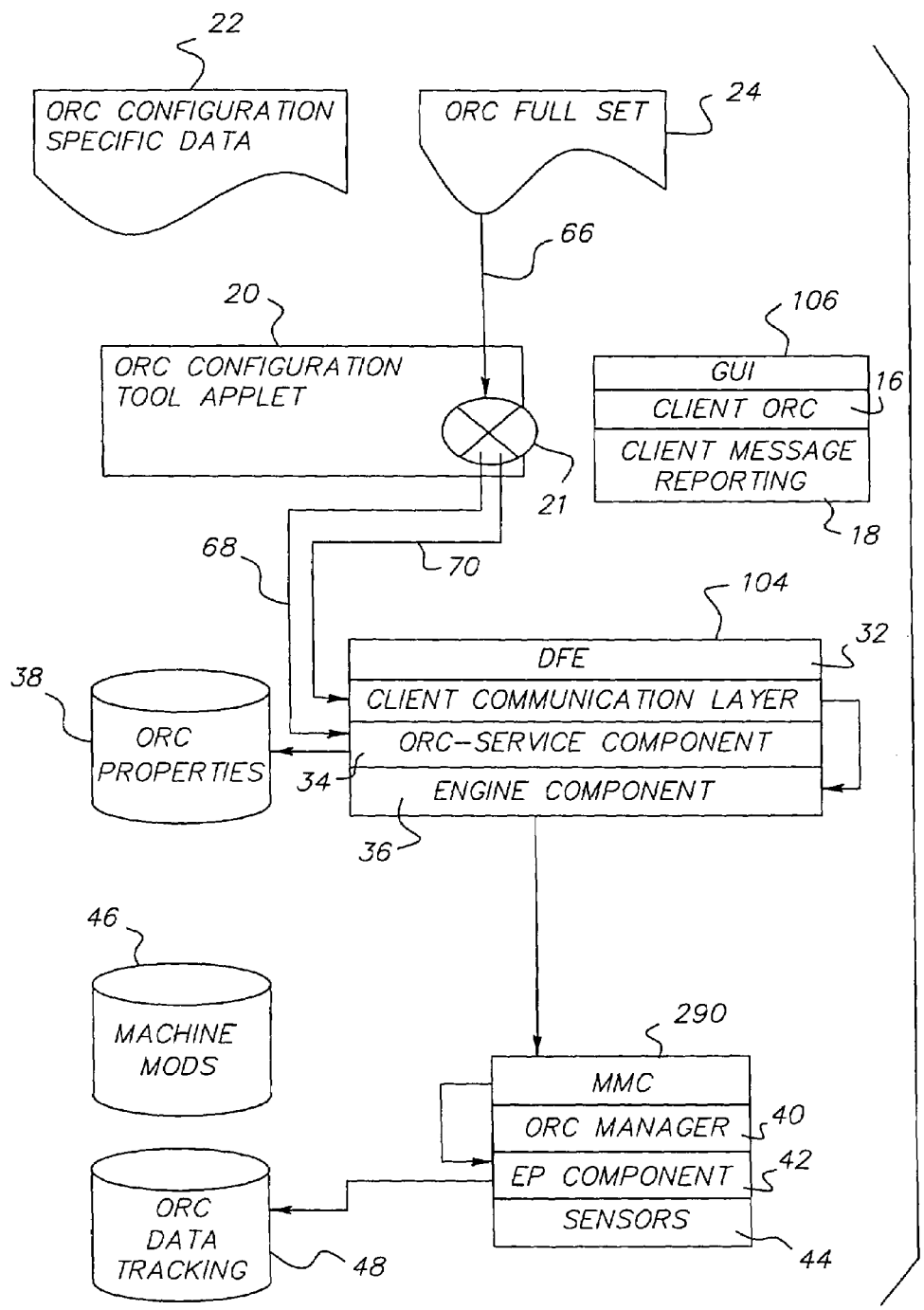
FIG. 3C is the block diagram of FIG. 3A with arrows illustrating the data filtering steps in the preferred embodiment of the invention.
Figure 3D:
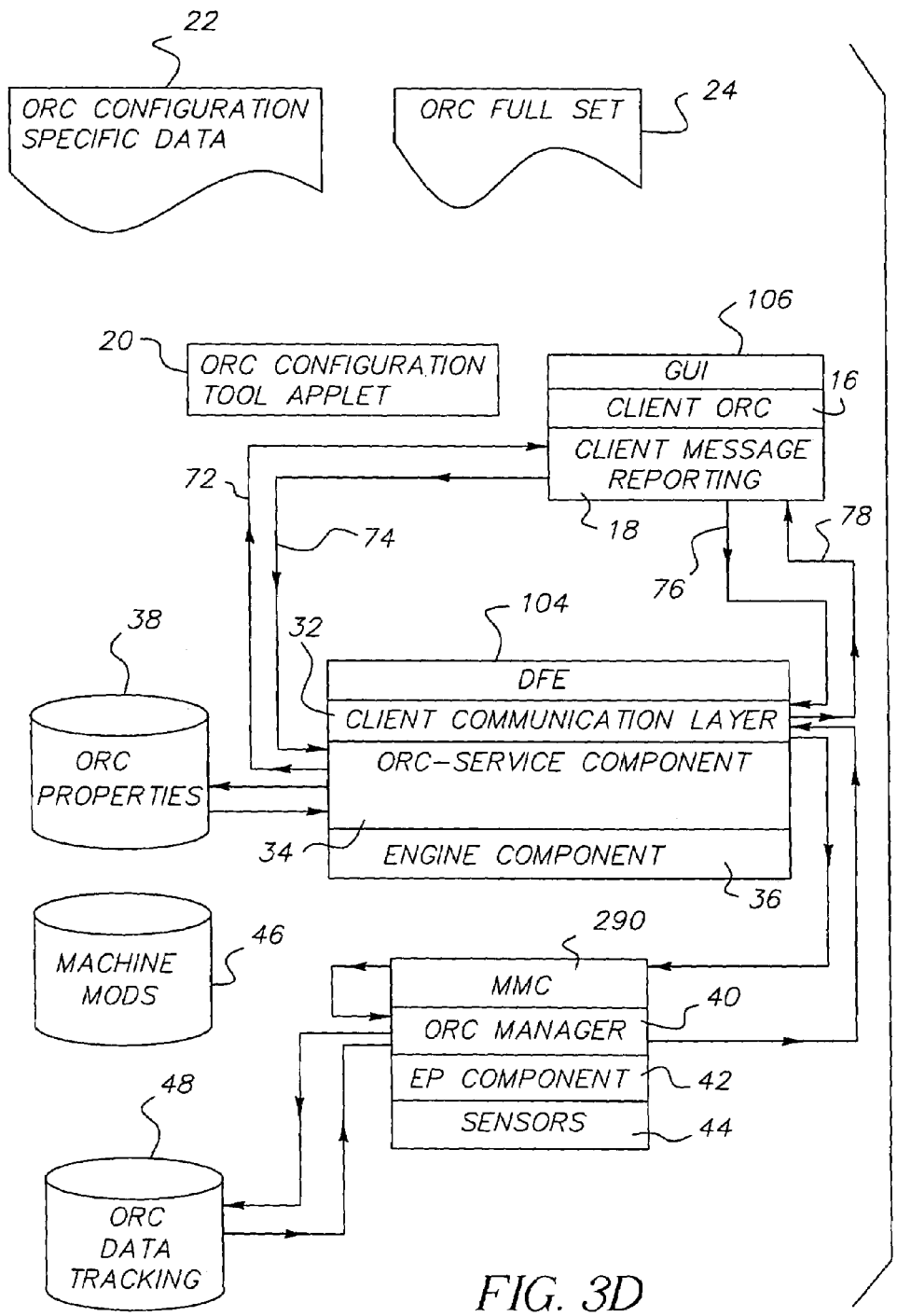
FIG. 3D is the block diagram of FIG. 3A with arrows illustrating the steps of communicating with the operator and/or field service engineer in the preferred embodiment of the invention.

FIGS. 3B–D illustrate schematically the steps in the method embodied in the invention. FIG. 3B illustrates retrieval of data, by the ORC Configuration Tool Applet 20, from the four sources described above. ORC Configuration Tool Applet 20 retrieves the stored ORC Configuration Specific Data 22, represented by arrow 60, Machine Mods 46 data, arrow 63, and data from Sensors 44 of MMC 290, arrow 64. ORC Configuration Tool Applet 20 also interrogates the operator and/or field engineer 26, arrows 61 and 62, for any ORC information that cannot be determined from the other three automatic sources. In the next steps, illustrated in FIG. 3C, using the information gathered from the above sources, the ORC Configuration Tool Applet 20 then creates a filter 21 that identifies and extracts, from the ORC Full Set 24, the correct ORC set to be used by ORC Manager 40 for ORC life tracking and by ORC Service Component 34 for any other ORC service functions. This step is illustrated by arrow 66. ORC Configuration Tool Applet 20 then stores the correct ORC set in the database ORC Properties 38, arrow 68, and also disables in database ORC Data Tracking 48 any of the ORC Full Set 24 that may have been active in a previous configuration but are not now included in the correct ORC set, arrow 70. FIG. 3D illustrates the step of communicating, to the operator and/or field engineer via GUI 106, the correct ORC set from database ORC Properties 46, arrows 72 and 74, and the correct ORC set life tracking data from database ORC Data Tracking 48, arrows 76 and 78.

The invention has been described in detail with particular reference to certain preferred embodiments thereof, but it will be understood that variations and modifications can be effected within the spirit and scope of the invention.

What is claimed is:

1. In a system having 1) variable system configurations, 2) replaceable components, and 3) a replaceable component life tracking process, a method of identifying a correct set of replaceable components for said life tracking process, said method comprising the steps of:

defining a complete set of all said replaceable components;

identifying each said system configuration with a system configuration parameter;

for each said system configuration, defining a configuration specific replaceable component set;

providing a user interface for inputting and saving system modification data whenever said system is modified, thereby resulting in a change to at least one of said system configurations;

inputting and saving, via said user interface, manually input replaceable component data;

providing a plurality of sensors, each said sensor sensing the presence of at least one of said replaceable components and providing sensed replaceable component data; and combining, said configuration specific replaceable component data based on said system configuration parameter, said sensed replaceable component data, said modification data, and said manually input replaceable component data, to identify, from said complete set of all said replaceable components, said correct set of replaceable components for said life tracking process.

2. The method of claim 1, further comprising the step of reporting said correct set of replaceable components to a system operator via said user interface.

3. The method of claim 2, wherein said user interface is a graphical user interface.

4. The method of claim 3, wherein said system is a printing device.

5. A replaceable component management system for determining a correct set of replaceable components for a replaceable component life tracking system in an apparatus with variable apparatus configurations, comprising:

a first data storage element having stored therein: 1) a complete set of all said replaceable components, and 2) a plurality of apparatus configuration parameters, each apparatus configuration parameter being cross referenced to a configuration specific replaceable component data set;

a user interface for: 1) inputting apparatus modification data to a second storage element whenever said apparatus is modified, thereby resulting in a change to at least one of said apparatus configurations, and 2) inputting manually input replaceable component data;

a first computational element coupled to said second storage element and to a plurality of sensors, each said sensor sensing the presence of at least one of said replaceable components and providing sensed replaceable component data; and a second computational element coupled to said first computational element, to said first storage element, and to said user interface, said second computational element combining said configuration specific replaceable component data, said sensed replaceable component data, said modification data, and said manually input replaceable component data, to identify, from said complete set of all said replaceable components, said correct set of replaceable components for said replaceable component life tracking system.

6. The replaceable component management system of claim 5, wherein said user interface is a graphical user interface.

7. The replaceable component management system of claim 6, wherein said apparatus is a printing device.

8. A method of managing replaceable components in a system, the method performed at least in part by a processing device and comprising the steps of:

identifying a set of replaceable components useable in the system;

receiving sensor information from sensors in the system identifying components installed in the system;

receiving modification information from a memory in the system identifying component changes that have been made to the system;

receiving operator information from an operator of the system identifying additional component information beyond that provided by the sensor information and the modification information; and determining a correct set of replaceable components being used in the system for component life tracking purposes based at least upon the sensor information, the modification information, and the operator information, the correct set of replaceable components being a subset of the set of replaceable components usable in the system.

* * * * *